United States Patent [19]

Becker et al.

[11] 4,268,422

[45] May 19, 1981

[54] TITANIUM DIOXIDE HYDRATE OF A PARTICULAR STRUCTURE AND PROCESS OF MANUFACTURE THEREOF

[75] Inventors: Heinrich Becker, Leverkusen; Edgar Klein, Odenthal-Osenau; Franz Rosendahl, Leverkusen; Helmut Weber, Odenthal-Osenau, all of Fed. Rep. of Germany

[73] Assignee: Kronos Titan G.m.b.H., Leverkusen, Fed. Rep. of Germany

[21] Appl. No.: 32,172

[22] Filed: Apr. 23, 1979

[30] Foreign Application Priority Data

Apr. 21, 1978 [DE] Fed. Rep. of Germany ....... 2817551

[51] Int. Cl.³ ..................... B01J 21/06; C01G 23/047
[52] U.S. Cl. .................................... 252/461; 423/610; 423/615; 423/616; 423/6; 209/5
[58] Field of Search ....................... 423/610, 615, 616; 106/300; 252/461; 209/5

[56] References Cited

U.S. PATENT DOCUMENTS

| | | | |
|---|---|---|---|
| 2,326,156 | 8/1943 | McCord | 106/300 |
| 2,333,660 | 11/1943 | McCord et al. | 423/616 |
| 2,448,683 | 9/1948 | Peterson | 423/616 |
| 3,211,528 | 10/1965 | Wiggenton | 423/616 |
| 3,567,480 | 3/1971 | Craig | 423/610 |
| 3,582,275 | 6/1971 | Sugahara et al. | 423/610 |
| 3,689,219 | 9/1972 | Craig | 423/610 |
| 3,862,297 | 1/1975 | Claridge et al. | 423/615 |
| 3,919,388 | 11/1975 | Thompson et al. | 423/615 |

OTHER PUBLICATIONS

Weiser et al., "Journal of Physical Chem.", vol. 38, 1934, pp. 513-519.

Primary Examiner—Herbert T. Carter
Attorney, Agent, or Firm—Gary M. Nath

[57] ABSTRACT

A novel titanium dioxide hydrate is provided whose structure exhibits X-ray diffraction peaks at 24.6±0.4° and 48±0.4°, and which is suitable as an adsorbent material. A process for preparing the novel titanium dioxide hydrate also is provided which includes hydrolyzing a specific titanium sulfate solution and thereafter flocculating colloidal titanium dioxide hydrate by the addition of a monobasic acid and recovering the titanium dioxide hydrate.

13 Claims, 1 Drawing Figure

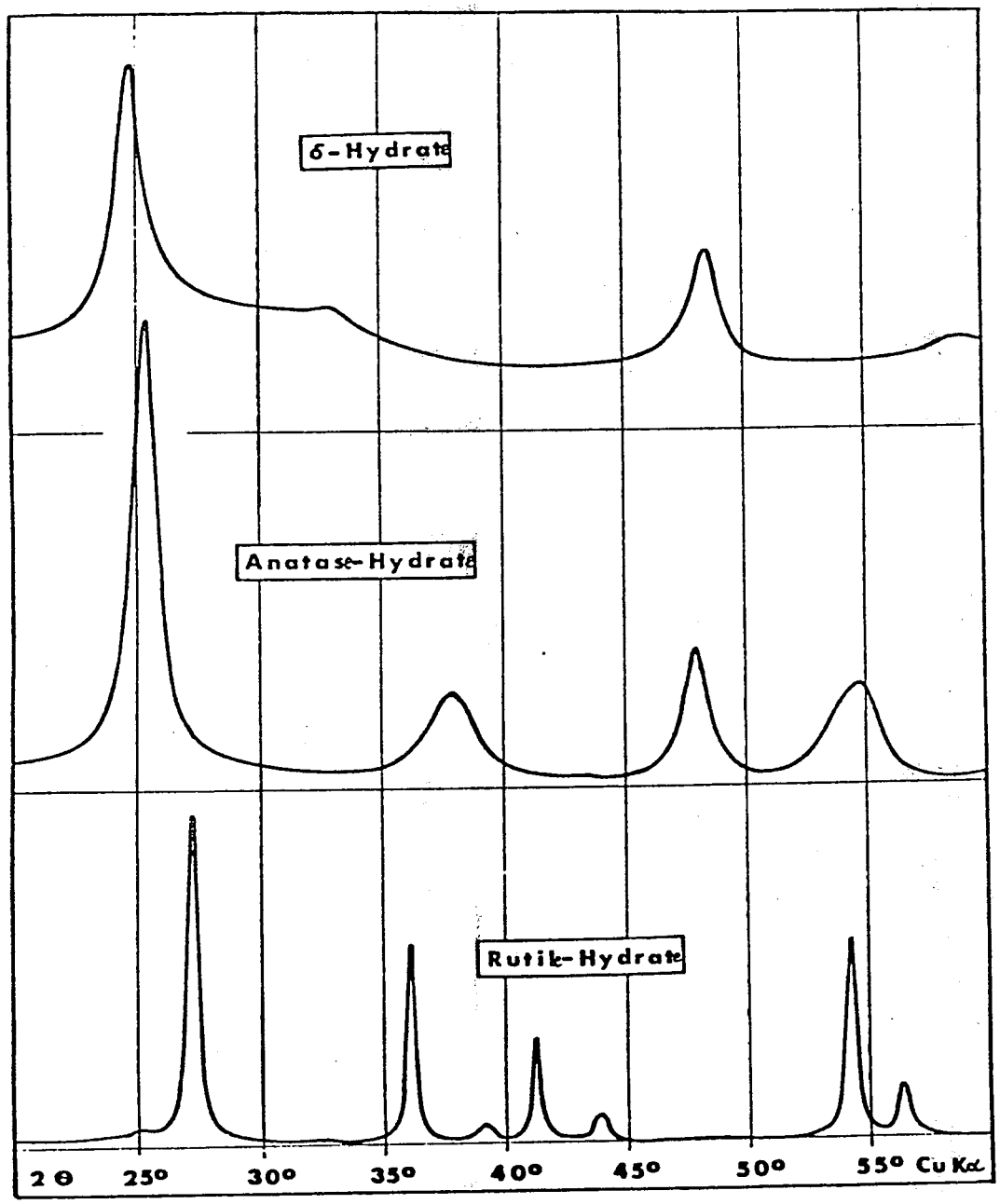

TITANIUM DIOXIDE HYDRATE OF A PARTICULAR STRUCTURE AND PROCESS OF MANUFACTURE THEREOF

The invention concerns a titanium dioxide hydrate of particular structure and a titanium dioxide hydrate mixture containing such titanium dioxide hydrate, as well as their production.

The thermal hydrolysis of titanium (IV) salt solutions, particularly titanium (IV) sulfate solutions, as obtained e.g. from ilmenite or other titanium ores or other titaniferous materials by their digestion with sulfuric acid in the industrial production of titanium dioxide pigments by the so-called sulfate process, will in the presence of appropriate hydrolyzation nuclei as a rule produce a titanium dioxide hydrate in which, as X-ray diffraction examinations have shown, the anatase structure is predetermined (Gmelins Handbuch der anorganischen Chemie, 8th edition, System No. 41 "Titan" (1951), page 229; J. Amer. Ceram. Soc., vol. 42, No. 3 (1959), pages 127 to 133).

If a titanium sulfate solution is hydrolyzed by an addition of alkali, the product will in X-ray analysis usually appear to be amorphous or it will show the main X-ray diffraction reflexes typical of anatase (J. Physic. Chem. 44 (1940), pages 1081 to 1094; J. Appl. Chem. 19 (1969), pages 46 to 51).

In the production of titanium dioxide pigments from titanium (IV) sulfate solutions measures are taken to obtain a titanium dioxide hydrate which either shows the anatase structure or the rutile structure. Such titanium dioxide hydrate is in the following called; "anatase hydrate" or "rutile hydrate" for short.

In studies on the hydrolysis of titanium (IV) sulfate solutions it has now been found that, under certain conditions, a defined titanium dioxide hydrate is formed which clearly differs from the anatase hydrate and the rutile hydrate in its physical and chemical properties. A titanium dioxide hydrate of a particular structure was found which is characterized in that the X-ray diffraction diagram taken by means of Cu-K$\alpha$ ray shows its main peaks at $2\theta = 24.6 \pm 0.4°$ and $48 \pm 0.4°$. In the following, this new titanium dioxide hydrate is for short also called "$\delta$-hydrate."

It is assumed that the $\delta$-hydrate is not only produced in the hydrolysis of titanium (IV) sulfate solutions but also in the hydrolysis of solutions of titanium (IV) salts containing other polyvalent anions, e.g. phosphate ions.

The FIGURE shows the X-ray diffraction diagrams of the $\delta$-hydrate in comparison with the known hydrates of anatase structure and rutile structure. The angles shown were all obtained under Cu-K$\alpha$ rays. The FIGURE shows that particularly the main X-ray reflex at 24.6° allows the $\delta$-hydrate to be distinguished clearly from the anatase (main X-ray reflex at 25.4°) and from the rutile (main X-ray reflex at 27.4°). Comparison with brookite showed that the $\delta$-hydrate and this modification are not related either. It is further distinguished from a titanium dioxide hydrate described in U.S. Pat. No. 2,333,662 which is called "$\gamma$-hydrate" and, unlike the $\delta$-hydrate, is showing an X-ray peak at 22.3°.

At room temperature the $\delta$-hydrate is stable for any period of time. Above about 350° C. it turns into anatase.

Unlike the anatase hydrate, which above a certain particle size is present in the sulfate solution in a flocculated state so that it can be removed by filtration or by means of a centrifuge, the $\delta$-hydrate is distributed in the sulfate solution in the colloidal state so that it cannot be separated from the sulfate solution by the same method. It is, however, possible by means of hydrochloric acid or other acids of monovalent anions or their salts to flocculate the $\delta$-hydrate to a concentration which allows it to be separated from the unhydrolyzed $TiO_2$ content and the mother liquor. Moreover, it is possible to re-peptize the precipitated, collected and washed $\delta$-hydrate, moist or dried, by adding sulfate anions (particularly in the form of sulfuric acid) or other bivalent or trivalent anions, which is not possible with the other $TiO_2$ hydrates produced from titanium sulfate solutions. After flocculation and separation from the sulfuric acid mother liquor and washing it contains over 30 parts by weight $H_2SO_4$ per 100 parts $TiO_2$.

Depending on the operating conditions, the $\delta$-hydrate is obtained in a more or less pure form or it is obtained as a mixture with other $TiO_2$ hydrates. A titanium dioxide hydrate mixture which, calculated as $TiO_2$ and related to the total quantity of $TiO_2$ present, contains over 20% titanium dioxide hydrate in its $\delta$-form, is very well suited for many applications, particularly as an adsorbent or collector.

A method of producing $\delta$-titanium dioxide hydrate or a titanium dioxide hydrate mixture containing more than 20% $\delta$-titanium dioxide hydrate, calculated as $TiO_2$ and related to the total $TiO_2$ present, is characterized in that a titanium sulfate solution containing up to 150 g/l $TiO_2$, whose molar ratio of $TiO_2$ to free sulfuric acid ranges between 1:1 and 1:2, whose content of bivalent iron ranges between 0 and 1 g Fe per g $TiO_2$ and which may also contain some trivalent titanium is hydrolyzed by heating, the titanium dioxide hydrate which may precipitate being removed if desired, and that the titanium dioxide hydrate which is distributed in the solution in the colloidal state is flocculated by the addition of a monobasic acid or its salts, and that the flocculated titanium dioxide hydrate is removed, as the case may be together with the titanium dioxide hydrate precipitated before flocculation but not removed, and that it is washed with water to remove iron and other foreign substances and dried if desired.

A further method of producing $\delta$-titanium dioxide hydrate or a titanium dioxide hydrate mixture containing more than 20% $\delta$-titanium dioxide hydrate, calculated as $TiO_2$ and related to the total quantity of $TiO_2$ present, is characterized in that a titanium sulfate solution containing 120 to 250 g/l $TiO_2$, whose molar ratio of $TiO_2$ to free sulfuric acid ranges between 1:1 and 1:2, whose content of bivalent iron ranges between 0 and 1 g Fe per g $TiO_2$ and which may also contain some trivalent titanium, is hydrolyzed by heating in the presence of nuclei of a titanium dioxide hydrate having an X-ray diffraction diagram taken by means of Cu-K$\delta$ rays which exhibits main peaks at $2\theta = 24.6 \pm 0.4°$ and $48 \pm 0.4°$, the titanium dioxide hydrate which may precipitate being removed if desired, and that the titanium dioxide hydrate which is distributed in the solution in the colloidal state is flocculated by the addition of a monobasic acid or its salts and that the flocculated titanium dioxide hydrate is separated from the solution, as the case may be together with the titanium dioxide hydrate precipitated before flocculation but not removed, and that it is washed with water to remove iron and other foreign substances and dried if desired.

The advantage of the latter method consists in that with the application of $\delta$-titanium dioxide hydrate nuclei the solution used may have a higher titanium content than without such nuclei. In particular, it is possible in that case to use solutions as customary in pigment production.

The δ-titanium dioxide hydrate nuclei are, for instance, produced in that part of the original titanium sulfate solution brought in a suitable manner, e.g. by dilution, to a $TiO_2$ content of up to 150 g/l $TiO_2$, a molar ratio of $TiO_2$ to free sulfuric acid ranging between 1:1 and 1:2, a content of bivalent iron ranging between 0 and 1 g Fe per g $TiO_2$, and if desired, to a certain content of trivalent titanium, is hydrolyzed by heating, that the titanium dioxide hydrate of anatase structure precipitated at that stage is removed, that the remaining titanium dioxide hydrate which is distributed in the solution in the colloidal state is then flocculated by addition of a monobasic acid or its salts and that the flocculated titanium dioxide hydrate of the δ-structure is separated from the solution and, if desired, washed with water.

The δ-titanium dioxide hydrate nuclei may, however, also be used in the form of the colloidal solution as available in the hydrolysis of a titanium sulfate solution to produce δ-titanium dioxide hydrate after the titanium dioxide hydrate precipitated first in the form of anatase hydrate has been removed, but before the monobasic acid or its salt is added.

Nuclei should generally be added at a quantity of 2 to 20%, calculated as $TiO_2$ and related to the $TiO_2$ content of the titanium sulfate solution.

The nuclei may be added to the titanium sulfate solution either before hydrolysis or at earlier stages of the process, e.g. at digestion or solution of the digestion cake.

The titanium sulfate solution can be produced by known method by the digestion of ilmenite, other titanium ores, slags or titanium concentrates with sulfuric acid. It is, for instance, possible to operate with a titanium sulfate solution as it is obtained in titanium dioxide pigment production by the sulfate process. If desired, iron is removed in the form of iron (II) sulfate heptahydrate before the solution is processed. It is essential that the titanium sulfate solution contains as few anatase nuclei as posible. This requirement can be met by suitable measures taken during digestion, solution of the digestion cake, reduction and/or clarification of the digestion solution. It is, for instance, advised to use dilute acid to dissolve the digestion cake. While the digestion cake is dissolved, the temperature should not rise above 60° C., and no more liquid should be used than needed to dissolve the digestion cake. In clarification, clarification agents should be used which flocculate the titanium dioxide dissolved as a colloid. Suitable methods are described e.g. in British Pat. No. 473,054 and U.S. Pat. Nos. 2,413,640 and 2,413,641. A solution very well suited for this purpose is also obtained by clarifying a titanium sulfate solution obtained in the known manner with the aid of diethyl aminoethyl acrylate polymers or polyacrylamides.

The optimum $TiO_2$ concentration in the solution to be used generally depends on its content of iron and sulfuric acid. In a solution containing 30 g/l $Fe^{2+}$, 250 g/l total sulfate calculated a $SO_4$, and 0.5 g/l $Ti^{3+}$, the optimum $TiO_2$ concentration is 100 g/l. Provided the solution used is practically free from nuclei it is possible, as the case may be after addition of δ-titanium dioxide hydrate nuclei, to recover up to 90% as δ-hydrate from the solution used.

At a lower iron content and/or a lower ratio of free sulfuric acid to $TiO_2$ in the solution used, the optimum for the $TiO_2$ concentration moves towards higher values ("free sulfuric acid" is generally unerstood to mean the sulfuric acid which, in the solution, is not bound to cations other than titanium). Concentrations can be adjusted suitably in digestion and/or in later process steps, e.g. in removing the iron (II) sulfate heptahydrate. The iron content and the sulfuric acid content can, on the other hand, be predetermined by the titaniferous feed material used (ilmenite, $TiO_2$ containing slag etc.).

The solution may contain up to 2 g/l trivalent titanium, which is formed in a manner known as such by reduction of the solution used to make sure that no trivalent iron is present during hydrolysis; in certain cases this content may be higher.

Hydrolysis is generally brought about simply by heating the solution to boiling temperature and maintaining it at this temperature; before hydrolysis none of the usual nuclei are added from outside or formed in the solution by e.g. mixing with water. Only nuclei of the δ-structure may be added before hydrolysis.

The duration of heating depens on the content of anatase nuclei in the solution, on the composition of the solution, and/or the addition or not of δ-hydrate nuclei. In general, yield of δ-titanium dioxide hydrate rises with the time of heating, but there may be other arguments advising against extended heating, e.g. product quality. After δ-hydrate nuclei have been added, the solution may be left unchanged or altered in its composition by e.g. evaporation or dilution before it is hydrolyzed.

δ-hydrate nuclei once formed or added continue to grow in the customary technical titanium sulfate solutions also outside the ranges of analytical composition favoring the spontaneous formation of nuclei. Since the ranges of analytical composition favoring the formation of δ-hydrate are as a rule passed through in the technical production of titanium dioxide hydrate from sulfuric acid digestion solutions, δ-hydrate will always be formed in small quantities. Its quantity does not only depend on the speed of nuclei formation and growth of the δ-hydrate but also on the number, size and speed of growth of the anatase nuclei, i.e. on the kinetics of anatase hydrate formation as a competitive reaction.

During hydrolysis often a precipitate essentially consisting of anatase hydrate is formed in the titanium sulfate solution whereas the δ-hydrate forming at the same time is contained in the solution as a colloid. If a titanium dioxide hydrate mixture containing both components is to be obtained, the precipitated anatase hydrate is removed together with the δ-hydrate after flocculation of the latter in the further processing of the hydrolyzed solution. If, on the other hand, the δ-hydrate is to be obtained in a highly concentrated or pure form, the precipitated anatase hydrate is removed from the solution in a manner known as such before flocculation of the δ-hydrate. The δ-hydrate is flocculated by the addition of a monobasic acid or its salts. Preference is given to hydrochloric acid, but also chlorides dissolving easily in water, e.g. sodium chloride, are favorably used. As a rule, the monovalent anions must be added at such a quantity that their concentration in the solution amounts to 1.5 to 8, but preferably 4 to 5 mole/l.

The precipitated titanium dioxide hydrate is washed in the same manner as customary in the production of titanium dioxide pigments; bleaching is, however, not always required.

A preferred embodiment of the method for the production of δ-hydrate or the titanium dioxide hydrate mixture containing more than 20% δ-titanium dioxide hydrate, calculated as $TiO_2$ and related to the total content of $TiO_2$, is characterized in that after addition of the monobasic acid or its salts the titanium dioxide hydrate present in the solution in a flocculated form is separated from the solution and washed and then neutralized with alkali or ammonia, whereafter it is, as desired, once more washed and/or dried.

In neutralization the $SO_4$ groups are exchanged for OH groups; this removes the sulfuric acid except for a small remainder, while the characteristic structure of the δ-hydrate is maintained. Neutralization is preferably conducted in an aqueous suspension. Thereafter, the neutralized hydrate can be washed and/or dried. The optimum pH to which the suspension is to be adjusted in neutralization depends to some degree on the conditions under which the product was made; it can easily be determined experimentally. The product can be neutralized prior to further processing by e.g. extrusion, drying the granulation, or after. The neutralized product is particularly well suited to be used as an adsorbent or collector.

The titanium dioxide hydrate, which after addition of the monobasic acid or its salts is present in the solution in a flocculated form, can be thickened by sedimentation before it is separated from the solution. Another preferred embodiment of the process consists in that a flocculant is added prior to separation of the titanium dioxide hydrate from the solution where after addition of the monobasic acid or its salts it is present in a flocculated form. The flocculant must be active in the highly acidic solution. Flocculants suited for this purpose are e.g. the polyacrylamides customarily offered on the market. The flocculant is preferably added to the suspension thickened by sedimentation. A suspension thus treated is easy to filter and the titanium dioxide hydrate collected is easy to wash.

For its use as an adsorbent the δ-titanium dioxide hydrate or the titanium dioxide hydrate mixture is preferably granulated after separation from the solution. It may be granulated before or after drying by a method known as such, granulation before drying being preferred. The product may, for instance, be granulated in such a manner that by extrusion through an orifice plate it is made into a paste or dried in a spray dryer. It is essential that the paste is not subjected to high shear forces for a longer period of time as they have a detrimental effect on the mechanical properties of the granulate.

A further embodiment of the invention is characterized in that, before drying, solid inorganic or organic substances insoluble in acids are added to the titanium dioxide hydrate or the titanium dioxide hydrate mixture at a ratio of up to 70 percent by weight related to the total mixture obtained, and that the whole mixture is then dried, after prior granulation if desired. This helps to improve the mechanical and/or adsorption properties of the δ-titanium dioxide hydrate or of an adsorbent containing this hydrate and/or the kinetics of adsorption. The solid substances may be added before precipitation, flocculation, neutralization or drying of the titanium dioxide hydrate or the titanium dioxide hydrate mixture. Suitable materials are e.g. fillers, as used in paints, or other substances having a large surface (cf. Ullmanns Encyklopadie der technischen Chemie, 3rd edition, vol. 13 (1962), pages 814 to 821, and "Chemische Technologie," edited by K. Winnacker and L. Kuchler, 3rd edition, vol. 2 (1970), pages 539 to 545). Kieselgur, mica, asbestos powder and active charcoal may be mentioned as examples.

The δ-titanium dioxide hydrate or a titanium dioxide hydrate mixture containing more than 20% δ-titanium dioxide hydrate, calculated as $TiO_2$ and related to the total quantity of $TiO_2$ present, shows excellent adsorption properties. It is particularly suited to be used as an adsorbent or collector in winning uranium and/or other elements from dilute aqueous solutions containing these elements. Because of its specific adsorptive power δ-hydrate was found to be superior to the titanium dioxide hydrates so far known. Thus it is extremely well suited as a uranium collector to be used in winning uranium from seawater.

The following examples may serve to illustrate the invention:

EXAMPLE 1

200 l of an ilmenite digestion solution, which was freed from the larger part of the iron by removal of iron (II) sulfate heptahydrate and which contained 150 g/l $TiO_2$, 45 g/l $Fe^{2+}$, 375 g/l total sulfates, calculated as $SO_4$, as well as 0.75 g/l $Ti^{3+}$, were placed in a brick-lined tank, which had a volume of 1000 l and was equipped with lead-covered heating coils and a lead-covered agitator, and diluted with water to make 300 l. The solution obtained contained 100 g/l $TiO_2$, 30 g/l $Fe^{2+}$, 250 g/l total sulfate calculated as $SO_4$, as well as 0.5 g/l $Ti^{3+}$. Under agitation, the contents of the tank were then indirectly heated to the boil by means of steam passed through the heating coils and maintained at the boil for about 30 minutes. Steam was then shut off and the mixture diluted to 600 l by adding cold water, which caused the temperature to drop to 62° C. The presence of a small quantity of anatase nuclei in the digestion solution was unavoidable, so that is hydrolysis a certain quantity of anatase hydrate was formed which did, however, not amount to more than about 5% of the total $TiO_2$ content. This anatase hydrate settled out when left to stand for about 70 hours. The supernatant solution being only slightly turbid and brown in color and containing about 50% of the total $TiO_2$ content as δ-hydrate distributed in the colloidal state, was drawn off by means of a siphon. 500 l of this solution were placed in another brick-lined tank of 1000 l volume and equipped with a rubber-covered agitator. Under agitation, 400 l 30% hydrochloric acid were then added to this solution during a period of 60 minutes. During this operation the δ-hydrate was flocculated. Left to stand over night, the δ-hydrate suspension was thickened to about 4 times its original solids content by drawing off the supernatant mother liquor. Shortly before filtration, 20 ml/l of a 2% aqueous solution of a commercial polyacrylamide (Tiofloc B 21 from Allied Colloids Ltd.) were stirred into this suspension. The δ-hydrate was filtered off and washed without difficulty.

The filter cake washed until it was free from iron was repulped with water in the cold to obtain a suspension easy to stir; then a 10% sodium hydroxide solution was slowly added until a pH of 7.0 was reached. After further stirring for 10 minutes, the pH was readjusted to 7.0 by adding some more sodium hydroxide solution. By then the δ-hydrate contained in the suspension was well flocculated and without requiring a flocculant to be added was easily filtered and washed. The paste obtained was forced through an extruder equipped with an orifice plate (5 mm orifice dia.) to form strings which were dried for about 12 hours at 110° C. The strings were then chopped to form a granulate having a grain size of about 3.5 mm dia. The content of fines was low because of the prior extrusion. The result was a quantity of about 10.5 kg dried titanium dioxide hydrate containing about 75% $TiO_2$, which corresponds to a recovery of about 26% $TiO_2$ related to the quantity of $TiO_2$ contained in the original solution.

In X-ray diffraction analysis no anatase reflexes were found to be detectable on the product thus made, in other words, the product consisted of practically pure δ-hydrate.

EXAMPLE 2

The solution used was taken from the same ilmenite digestion solution as used in Example 1. A portion of this solution (30 l) was diluted to 100 g/l $TiO_2$ as described in Example 1, heated to the boil and held at the boil for 20 minutes. At the end of this period, about 30% of the titanium contained in the solution were found to be hydrolyzed in the form of δ-hydrate.

The other part of the digestion solution was concentrated under vacuum to a content of 250 g/l $TiO_2$. 100 l of this concentrated solution were mixed with the δ-hydrate containing reaction mixture produced from the first portion of the ilmenite digestion solution. Under agitation, this mixture was heated to the boil and held at the boil for 60 minutes. At the end of this period, about 30% of the total $TiO_2$ present were found to be hydrolyzed, 25% in the form of δ-hydrate and 5% in the form of anatase hydrate.

The reaction mixture was diluted with water to make 600 l, which caused the temperature to drop below 50° C. The anatase hydrate was then removed and the δ-hydrate flocculated and isolated in the same manner as described in Example 1. Also on this product, no anatase reflexes were detectable, but only the reflexes of the δ-hydrate.

What is claimed is:

1. δTitanium dioxide hydrate having an X-ray diffraction diagram taken by means of Cu-Kα rays which exhibits main peaks at $2\theta=24.6\pm0.4°$ and $48\pm0.4°$.

2. A mixture of titanium dioxide hydrates, which, calculated as $TiO_2$ and related to the total quantity of $TiO_2$, contains more than 20% δ titanium dioxide hydrate having an X-ray diffraction diagram taken by means of Cu-Kα rays which exhibits main peaks at $2\theta=24.6°\pm0.4°$ C. and $48°\pm0.4°$ C.

3. A process for producing δ titanium dioxide hydrate having an X-ray diffraction diagram taken by means of Cu-Kα rays which exhibits main peaks at $2\theta=24.6°\pm0.4°$ and $48°\pm0.4°$, and mixtures of titanium dioxide hydrates containing at least 20% of said δ titanium dioxide hydrate which comprises: hydrolyzing a titanium sulfate solution by heating to form colloidal δ titanium dioxide hydrate, said solution containing up to 150 g/l $TiO_2$, and having a molar ratio of $TiO_2$ to free sulphuric acid between 1:1 and 1:2, and a bivalent iron content between 0 and 1 gram Fe per gram $TiO_2$; removing the colloidal δ titanium dioxide hydrate by flocculation by the adding of a monobasic acid or its salt; and separating the flocculated δ titanium dioxide hydrate from the solution.

4. A process for preparing δ titanium dioxide hydrate and mixtures of titanium dioxide hydrates containing at least 20% δ titanium dioxide hydrate wherein said δ titanium dioxide hydrate has an X-ray diffraction diagram taken by means of Cu-Kα rays which exhibits main peaks at $2\theta=24.6°\pm0.4°$ and $48°\pm0.4°$, which comprises: hydrolyzing a titanium sulfate solution by heating in the presence of nuclei of titanium dioxide hydrate having an X-ray diffraction diagram taken by means of Cu-Kθ rays which exhibit main peaks at $2\theta=24.6°\pm0.4°$ and $48°\pm0.4°$ to form colloidal δ titanium dioxide hydrate, said solution containing 120 to 250 g/l $TiO_2$, having a molar ratio of $TiO_2$ to free sulfuric acid between 1:1 and 1:2 and a bivalent iron content between 0 and 1 gram Fe per gram $TiO_2$; removing the colloidal δ titanium dioxide hydrate by flocculation by the addition of a monobasic acid or its salt; and separating the flocculated δ titanium dioxide hydrate together with precipitated titanium dioxide hydrate consisting essentially of anatase hydrate from the solution.

5. Process according to claims 3 or 4, characterized in that the titanium dioxide hydrate, which after the addition of the monobasic acid or its salts is present in the solution in a flocculated form, is removed and washed and then neutralized with alkali or ammonia and once more washed and/or dried.

6. Process in accordance with claims 3 or 4, characterized in that the titanium dioxide hydrate, which after the addition of the monobasic acid or its salts is present in the solution in a flocculated form, is thickened by sedimentation before being separated from the solution.

7. Process according to claims 3 or 4, characterized in that, before separation of the titanium dioxide hydrate which after the addition of a monobasic acid or its salts is present in the solution in a flocculated form, a flocculant is added.

8. Process according to claims 3 or 4, characterized in that, after its separation from the solution, the titanium dioxide hydrate or the titanium dioxide hydrate mixture is granulated.

9. Process in accordance with claims 3 or 4, characterized in that, solid inorganic or organic substances insoluble in acids are added to the titanium dioxide hydrate or the titanium dioxide hydrate mixture at a quantity of up to 70% by weight related to the resulting total mixture and that the total mixture thus obtained is then dried.

10. The process of claim 3 or 4 wherein precipitated titanium dioxide hydrate consisting essentially of anatase hydrate is removed from the hydrolyzed solution prior to removing the colloidal δ titanium dioxide hydrate by flocculation.

11. The process of claim 3 or 4 wherein the monobasic acid or its salt is added to the solution in amounts of 1.5 to 8 moles/liter.

12. The process of claim 3 or 4 wherein the separated material is washed with water to remove iron and other impurities.

13. The process of claim 3 or 4 wherein hydrolysis of the titanium sulfate solution is conducted in the presence of a trivalent titanium as a reductant.

* * * * *

UNITED STATES PATENT OFFICE
CERTIFICATE OF CORRECTION

Patent No. 4,268,422          Dated   May 19, 1981

Inventor(s)  Heinrich Becker et al.

It is certified that error appears in the above-identified patent and that said Letters Patent are hereby corrected as shown below:

Claim 4, line 12, "Cu-Kθ rays" should read --Cu-Kα rays--.

Signed and Sealed this

Eleventh Day of August 1981

[SEAL]

Attest:

Attesting Officer

GERALD J. MOSSINGHOFF
Commissioner of Patents and Trademarks